United States Patent
Schneider et al.

(10) Patent No.: US 7,827,001 B2
(45) Date of Patent: Nov. 2, 2010

(54) METHOD FOR FAULT DETECTION IN AN ACTUATOR

(75) Inventors: Florian Schneider, Lindenberg (DE); Roland Mair, Tettnang-Laimnau (DE); Bernd Apfelbacher, Friedrichshafen (DE); Thomas Jäger, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 74 days.

(21) Appl. No.: 12/282,387

(22) PCT Filed: Feb. 21, 2007

(86) PCT No.: PCT/EP2007/051679
§ 371 (c)(1),
(2), (4) Date: Sep. 10, 2008

(87) PCT Pub. No.: WO2007/104631
PCT Pub. Date: Sep. 20, 2007

(65) Prior Publication Data
US 2009/0099810 A1    Apr. 16, 2009

(30) Foreign Application Priority Data
Mar. 15, 2006   (DE) .................. 10 2006 011 807

(51) Int. Cl.
G06F 11/00    (2006.01)
G06F 19/00    (2006.01)

(52) U.S. Cl. ..................................... 702/150

(58) Field of Classification Search ............... 702/150, 702/33–36, 58, 94, 95, 81, 104, 113–116, 702/183, 185; 73/1.79, 649; 324/500, 415–424
See application file for complete search history.

(56) References Cited

U.S. PATENT DOCUMENTS

| | | | | |
|---|---|---|---|---|
| 4,355,358 A | * | 10/1982 | Clelford et al. | 701/3 |
| 6,547,699 B2 | * | 4/2003 | Eich et al. | 477/175 |
| 2002/0035015 A1 | * | 3/2002 | Eich et al. | 477/175 |
| 2003/0130092 A1 | * | 7/2003 | Eich et al. | 477/175 |
| 2004/0127329 A1 | * | 7/2004 | Eich et al. | 477/34 |
| 2004/0254696 A1 | | 12/2004 | Foerstner et al. | |

FOREIGN PATENT DOCUMENTS

| | | |
|---|---|---|
| DE | 198 23 089 A1 | 12/1998 |
| DE | 101 37 597 A1 | 3/2002 |
| DE | 103 26 557 A1 | 1/2005 |
| EP | 1 257 746 B1 | 10/2004 |
| GB | 2 330 889 A | 5/1999 |
| GB | 2 369 869 A | 6/2002 |
| WO | WO 01/63136 A1 | 8/2001 |

* cited by examiner

*Primary Examiner*—Cindy H Khuu
(74) *Attorney, Agent, or Firm*—Davis & Bujold, P.L.L.C.

(57) ABSTRACT

A method for detecting fault in an actuator. By transmitting a control value, which is generated by a control unit, to an input of the actuator a signal for the measured actuator position is produced at the output of the actuator. The signal for the measured actuator position is sent to an input of a signal conditioning unit which determines from it a measure of actuator movement. The control value is also transmitted to an input of a modeling unit, which calculates from it an expected measure of actuator movement. These movements are sent to a computer unit, which produces a corresponding status signal for the functionality of the actuator and for the functionality of the sensor for determining the actuator position.

5 Claims, 1 Drawing Sheet

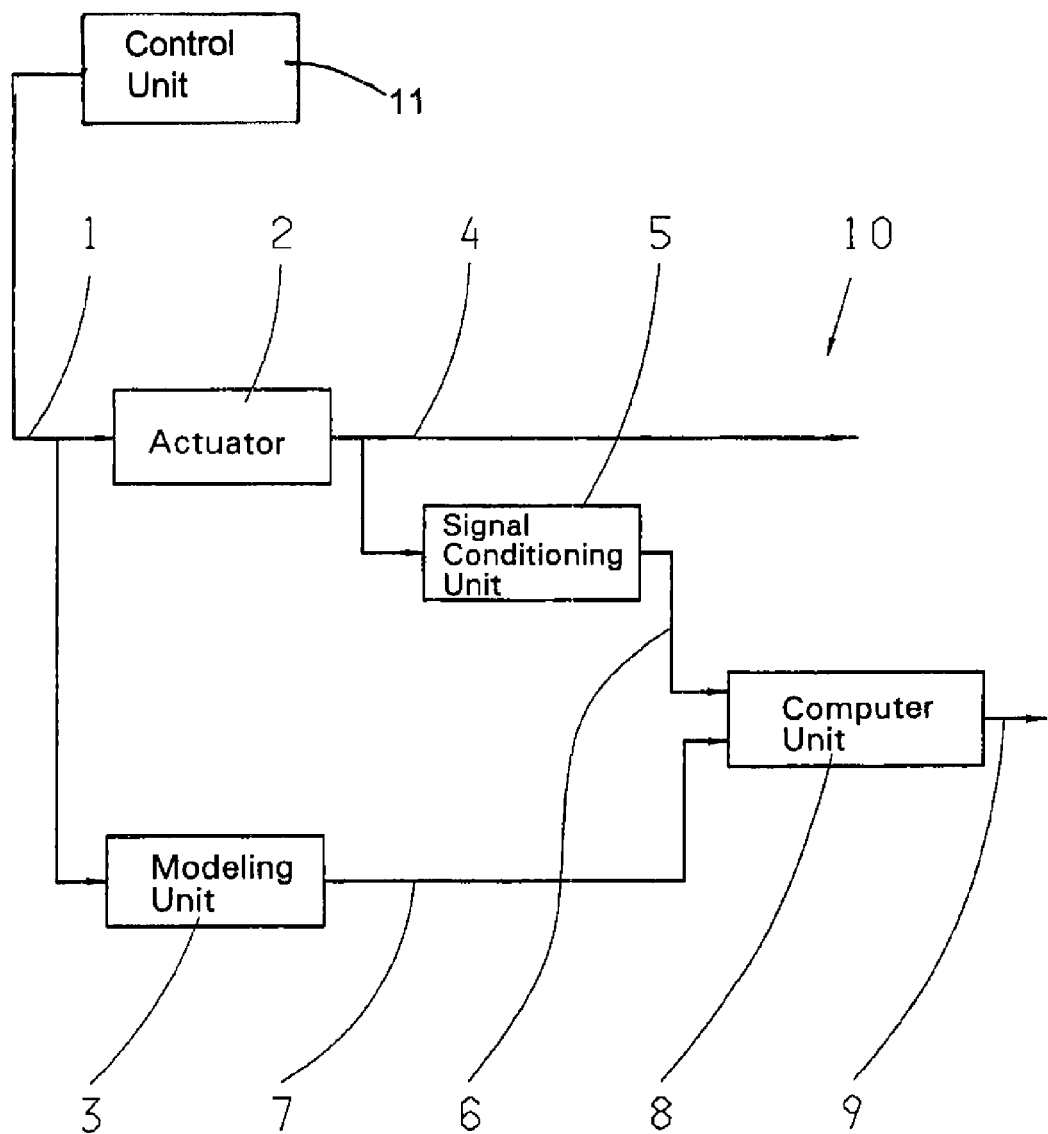

METHOD FOR FAULT DETECTION IN AN ACTUATOR

This application is a national stage completion of PCT/EP2007/051679 filed Feb. 21, 2007, which claims priority from German Application Serial No. 10 2006 011 807.3 filed Mar. 15, 2006.

FIELD OF THE INVENTION

The invention concerns a method for fault detection in an actuator.

BACKGROUND OF THE INVENTION

In connection with automatic or automated variable-speed transmissions or clutches, it is known to derive a measurement magnitude by way of sensors, which indicates the position of an actuator. But since a sensor for detecting the position of an actuator may be defective, the actuator position indicated by the sensor is not unconditionally reliable. Thus, it is very advisable, in connection with the safety monitoring of automatic or automated change-speed transmissions, to check the actuator position.

From DE 101 37 597 A1, a method for fault diagnosis in a clutch actuator is known. In this method, a control value is applied to an input of the clutch actuator. As a function of this control value, a corresponding electric signal for the measured actuator position is produced at an output of the clutch actuator. From the same control value, an actuator model unit calculates an expected actuator position and sends it to the output of the actuator model unit. The signals for the measured actuator position and the expected actuator position are compared with one another in a comparing unit. The signal, present at the output of the comparing unit, is sent to a computer unit, which produces a corresponding status signal at its output. If there is approximate agreement, between the signals for the measured and estimated actuator positions, the computer unit concludes on the basis of an evaluation algorithm that the clutch actuator is functional and the sensor for determining the position of the clutch actuator is also functional. In contrast, if there is a large difference between the signals for the measured and expected actuator positions, it is concluded that a fault exists in the clutch actuator and/or the sensor for determining the position of the clutch actuator.

In the fault diagnosis method described, the measured actuator position is compared with a model-based actuator position. Since the model for calculating the actuator position deviates from reality, for example because the behaviour of the system cannot be modelled exactly, at each calculation step there is a discrepancy between the actual and the calculated and therefore expected position of the clutch actuator. To avoid a progressive drifting apart of the actual and calculated actuator positions from one another, in DE 101 37 597 A1 the output signal from the comparing unit, which is formed from the measured and calculated actuator positions, is fed back to the input of the actuator model unit and evaluated.

If, now, an error of the measured actuator position occurs, this is transposed into the calculated actuator position by the feedback of the comparing unit's output signal into the actuator model, and so to the calculated actuator position. The disadvantage of this is that because of the feedback to the actuator model the erroneous actuator position is retained in the model value, so errors of the measured actuator position are sometimes not recognized.

A clutch model is usually based on the fact that the position change is calculated continuously by virtue of a value actuation and this calculated value is integrated. Since the clutch model is calculated by a digital computer, position changes are only detected at discrete time points. These position changes relate to the time interval between two calculation steps. Consequently, instead of integrating the position change it is necessary to carry out a summation. To be able to solve this equation with a digital computer, the differential equation must be converted to a difference equation. Since the clutch model usually deviates from reality, for example because the behavior of the system cannot be modeled exactly, at each calculation step there is a deviation between the actual and the calculated position of the clutch actuator. This makes it evident that there is in principle a difference between the calculated and the measured position, which adds up with the passage of time.

The purpose of the present invention is to indicate a method for fault detection in an actuator, which ensures reliable monitoring of the position of the actuator and which eliminates the disadvantages of the prior art.

The objective addressed by the invention is achieved by a method of the type in question for fault detection in an actuator.

SUMMARY OF THE INVENTION

In the method according to the invention for fault detection in an actuator, a control value is applied simultaneously to an input of an actuator and to an input of a modeling unit. The control value is generated by a control unit, for example by the control unit of an automatic or automated variable-speed transmission or of an automated clutch. In the modeling unit, expected actuator movements for the actuator can be calculated for all possible control values. As a function of the control value applied at the input, a corresponding electric signal is produced by a sensor at an output of the actuator. This signal corresponds to the measured actuator position and is passed on to a signal conditioning unit. By way of the signal conditioning unit and by virtue of the measured actuator position, the actual position change of the actuator, i.e., the actual actuator movement, is determined. In the modeling unit, with reference to the control value applied at the input the position change of the actuator, i.e., the actuator's movement, is calculated on the basis of the model. The model-based position change and the actual position change of the actuator are transmitted to the inputs of a computer unit. In the computer unit the model-based and the actual position changes of the actuator are compared with one another and evaluated by an appropriate algorithm. A corresponding status signal is emitted at the output of the computer unit. If there is approximate agreement between the signals for the measured and calculated position changes, the status signal emitted at the output of the computer unit indicates that the actuator and the sensor for determining the actuator position are both functional. If the measured and calculated actuator movements differ substantially, it can be concluded that there is a fault in the actuator and/or the sensor.

The advantage of this method is that the actuator movement indicated by the sensor and the actuator movement of the model are determined only over a defined time interval, so that a drifting separation of the measured and calculated actuator positions is prevented. This time interval is chosen to be not too large and thus covers about 10 to 20 calculation cycles. By summation of the movements typically over 10 to 20 calculation cycles the error occurring is limited to 10 to 20 times the error in one calculation cycle. This maximum error is taken into account in the comparison of the sensor and model position changes, whereby a fault in the actuator and/or the sensor for determining the actuator position is recognized with certainty. Thus, it is no longer necessary to feed back the measured actuator position to the modeling unit.

BRIEF DESCRIPTION OF THE DRAWING

The invention will now be described, by way of example, with reference to the accompanying drawing in which:

The single FIGURE shows a block diagram of an embodiment of the invention for monitoring an actuator.

DETAILED DESCRIPTION OF THE INVENTION

In the sole FIGURE, the block diagram 10 comprises an actuator 2, a modeling unit 3, a signal conditioning unit 5 and a computer unit 8. From a control unit 11, for example that of an automatic variable-speed transmission, a control value 1, appropriate for actuating the actuator 2, is sent both to the actuator 2 and to the modeling unit 3. As a function of the control value 1 applied, at an output of the actuator 2, a corresponding electric signal is produced by a sensor. This signal, which represents the measured actuator position 4, is sent to the signal conditioning unit 5. In the signal conditioning unit 5, the position change of the actuator, i.e., the actuator movement, is derived from the position signal of the sensor. At the output of the signal conditioning unit 5, the measured actuator movement 6 is now available. The control value 1 is also sent to the modeling unit 3. As a function of the control value 1 supplied, in the modeling unit 3, an expected actuator movement is calculated. A calculated actuator movement 7 is made available at the output of the modeling unit 3. A measured actuator movement 6 and the calculated actuator movement 7 are sent to inputs of a computer unit 8, compared with one another in the computer unit 8, and evaluated by an appropriate algorithm. At the output of the computer unit 8, a corresponding status signal 9 is emitted. If a large difference is found when the measured actuator movement 6 and the calculated actuator movement 7 are compared, then it can be concluded that there is a fault in the actuator 2 and/or in the sensor for determining the actuator position 4, or an error in the measurement data capture. If the signals for the measured and calculated actuator movements 6, 7 are in approximate agreement, then the status signal 9 is emitted at the output of the computer unit 8 which indicates that the actuator 2 and the sensor for determining the actuator position 4 are both functional.

In this case, the actuator movement 6 determined by the sensor and the calculated actuator movement 7 are determined only over a defined time interval, which is chosen to be not too large. For example, a typical interval for determining the actuator movements 6, 7 covers 10 to 20 calculation cycles. By summing the actuator movements 6, 7 over an interval of 10 to 20 calculation cycles, the error occurring is limited to 10 to 20 times the error during one calculation cycle. This maximum error occurring is taken into account in the comparison of the sensor and the model position changes, whereby a fault in the actuator 2 and/or the sensor for determining the actuator position 4 can be signaled with certainty.

| Reference numerals | |
|---|---|
| 1 | control value |
| 2 | actuator |
| 3 | modeling unit |
| 4 | measured actuator position |
| 5 | signal conditioning unit |
| 6 | measured actuator position |
| 7 | calculated actuator position |
| 8 | computer unit |
| 9 | status signal |
| 10 | block diagram |

The invention claimed is:

1. A method for fault detection in an actuator (2), the method comprising the steps of:

generating a control value (1) via a control unit (11);

transmitting the control value (1) to both an actuator (2) and a modeling unit (3);

sensing a measured actuator position (4) with a sensor with the measured actuator position (4) being relative to the control value (1);

sending the measured actuator position (4), sensed by the sensor, to a signal conditioning unit (5) which determines a measured actuator movement (6) from the measured actuator position (4) over a defined time interval;

calculating, in the modeling unit (3), an expected actuator movement (7) based solely upon the control value (1) which is the only input to the modeling unit (3) over the defined time interval;

sending both the measured actuator movement (6), from the conditioning unit (5), and the expected actuator movement (7), from the modeling unit (3) to a computer unit (8) such that by summing the measured actuator movement (6) and the expected actuator movement (7) over the defined time interval between 10 and 20 calculation cycles, a drifting separation of the measured actuator movement (6) from the expected actuator movement (7) is minimized; and producing at an output, via the computer unit (8), corresponding status signal (9) concerning a functioning status of at least one of the actuator (2) and the sensor for determining the actuator position (4).

2. The method according to claim 1, further comprising the step of, if there is approximate agreement between the signal for the measured actuator movement (6) and the signal for the expected actuator movement (7), producing a status signal (9) via the computer unit (8) which indicates the functionality of the actuator (2) and the functionality of the sensor for determining the actuator position (4).

3. The method according to claim 1, further comprising the step of, if a specified acceptable difference between the signal for the measured actuator movement (6) and the signal for the expected actuator movement (7) is exceeded, producing a status signal (9) via the computer unit (8) which indicates that there is a fault in at least one of the actuator (2) and the sensor for determining the actuator position (4).

4. A method for fault detection in an actuator (2), in which a control value (1), generated by a control unit (11), being supplied as an input to the actuator (2) and also as an input to a modeling unit (3), an output of the actuator (2) being connected to an input of a signal conditioning unit (5), an output of the signal conditioning unit (5), being connected as a first input to a computer unit (8), and an output of the modeling unit (3) being connected as a second input to the computer unit (8), the method comprising the steps of:

generating the control value (1) via a control unit (11);

transmitting the control value (1) to both the actuator (2) and a modeling unit (3);

sensing a measured actuator position (4) with a sensor of the actuator (2), the measured actuator position (4) being relative to the control value (1) and transmitting the measured actuator position (4) to the signal conditioning unit (5);

determining a measured actuator movement (6) over a defined time interval from the measured actuator position (4), which was transmitted to the signal conditioning unit (5), and transmitting the measured actuator movement (6) to the computer unit (8) as the first input;

calculating from the control value (1), in the modeling unit (3) without any feedback from the signal conditioning unit (5) and the computer unit (8) into the modeling unit (3) over the defined time interval, an expected actuator movement (7) and transmitting the expected actuator movement (7) to the computer unit (8) as the second input;

summing the measured actuator movement (6) and the expected actuator movement (7) over the defined time interval between 10 and 20 calculation cycles to prevent a drifting separation of the measured actuator movement (6) and the expected actuator movement (7); and producing a status signal (9), via the computer unit (8), that relates to a difference between the measured actuator movement (6) and the expected actuator movement (7) and corresponds to a functioning status of at least one of the actuator (2) and the sensor for determining the actuator position (4).

5. A method for fault detection in an actuator (2) in which a control value (1), generated by a control unit (11), being applied at an input to the actuator (2) and also as an input to a modeling unit (3) for calculating an expected actuator movement (7) based upon the control value (1), the actuator (2) having a sensor for producing a signal indicative of a measured actuator position (4), and the actuator (2) outputting the signal indicative of the measured actuator position (4) to a signal conditioning unit, (5) for deriving a measured actuator movement (6) from the position signal of the sensor, the signal conditioning unit(5) sending the measured actuator movement (6) as a first input to a computer unit (8), and the expected actuator movement (7) being sent, by the modeling unit (3), as a second input to the computer unit (8), the method comprising the steps of:

generating the control value (1) via the control unit (11);

transmitting the control value (1) to both the actuator (2) and the modeling unit (3);

sensing the measured actuator position (4) with the sensor of the actuator (2) with the measured actuator position (4) being relative to the control value (1), and transmitting the measured actuator position (4) to the signal conditioning unit (5);

determining the measured actuator movement (6) over a defined time interval from the measured actuator position (4), which was transmitted to the signal conditioning unit (5), and transmitting the measured actuator movement (6) to the computer unit (8) as the first input;

calculating from the control value (1), in the modeling unit (3), any expected actuator movement (7) without any feedback from the signal conditioning unit (5) and the computer unit (8) into from the modeling unit (3) over the defined time interval, and transmitting the expected actuator movement (7) to the computer unit (8) as the second input;

summing the measured actuator movement (6) and the expected actuator movement (7) over the defined time interval between 10 and 20 calculation cycles for preventing a drifting separation of the measured actuator movement (6) and the expected actuator movement (7); and producing a status signal (9), via the computer unit (8), that indicates any excessive difference between the measured actuator movement (6) and the expected actuator movement (7) which corresponds to a operating status of the actuator (2) and a functionality of the sensor.

* * * * *